Feb. 27, 1951 E. W. KAMMER 2,543,028

ELECTRONIC SWITCH

Filed April 17, 1946

INVENTOR.
ERWIN W. KAMMER

BY M. C. Hayes

ATTORNEY

Patented Feb. 27, 1951

2,543,028

UNITED STATES PATENT OFFICE 2,543,028

ELECTRONIC SWITCH

Erwin W. Kammer, Fairlington, Va.

Application April 17, 1946, Serial No. 662,767

3 Claims. (Cl. 179—171)

(Granted under the act of March 3, 1883, as amended April 30, 1928; 370 O. G. 757)

This invention relates generally to electronic switches, and more particularly, to an electronic switch comprising an adaptor for extending the useful lower frequency limit of a capacitively coupled electrical circuit down to zero frequency.

A standard capacitively coupled electrical circuit which is designed to provide good frequency response at the higher frequencies will not respond accurately to extremely low frequency alternating current variations or to direct current variations of applied voltage. This occurs because of the short time constants of the resistance-capacitance, hereinafter referred to as R.-C., coupling networks provided in such a circuit, as for example, in an ordinary alternating current amplifier. In many applications it is often desirable to use such R.-C. coupled amplifiers, for example in measuring circuits, in which the input signal may be a very low frequency alternating current or a varying direct current signal. Such input signal may in addition comprise a high-frequency sinusoidal voltage superimposed on the A. C. or slowly varying D. C. voltage. Due to the short time constant of the R.-C. input circuit for A. C. amplifiers having a normal frequency response range, the low frequency alternating current portions or the varying direct current portions of the input signal would either disappear or be distorted due to discharge of the input circuit after this input signal is initially applied.

Accordingly, it is an object of this invention to render a capacitively coupled alternating current amplifier, for example, useful at frequencies down to zero frequency.

Another object of this invention is to provide means in combination with a conventional alternating current amplifier to effectively extend the lower frequency response limit of the amplifier.

Another object of the invention is the provision of means in combination with a capacitively coupled alternating current amplifier to convert the input signal to said amplifier into a high frequency pulse signal in which the instantaneous amplitudes of the pulses maintain a proportional amplitude relationship with the corresponding portion of the input signal over substantially the entire time duration of the input signal.

Other objects, advantages, and capabilities of the invention will become apparent from the following description, taken in conjunction with the accompanying drawings showing only a preferred embodiment of the invention, in which.

Figure 1:
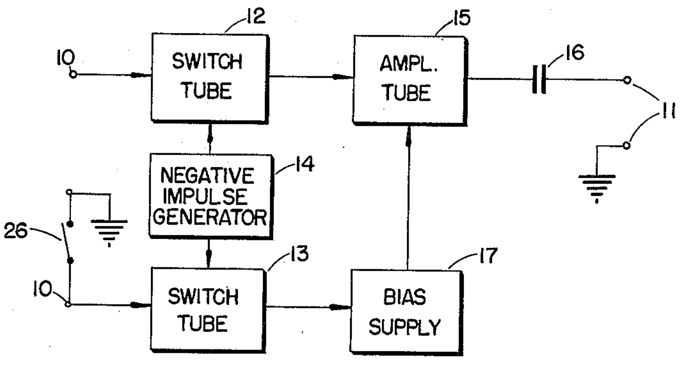
Fig. 1 is a block diagram of an adapter embodying the present invention.

Referring now to Fig. 1 showing a block diagram of an exemplary embodiment of the present invention, an input signal to be measured or amplified without amplitude distortion is applied to the input terminal 10 and appears in slightly modified form at output terminals 11 ready for application to the input terminals of an A. C. amplifier, not shown.

A pair of switch tubes 12 and 13 are coupled to the input terminals 10 to receive the input signal. Each of these tubes comprises an electron tube of conventional design which is normally held in a conducting state but is caused to cease conduction periodically by application of negative voltage impulses from a negative impulse generator 14 coupled to each of the switch tubes. While the tubes 12 and 13 are non-conducting, means are provided for producing from each switch tube an output voltage having a predetermined constant value, preferably zero voltage. The duration of the impulses generated by negative impulse generator 14, thus, the length of time that tubes 12 and 13 are held in a non-conducting state, is short in comparison to the period of the impulse generator 14—one-tenth or one-twentieth of that period. For example, the repetition rate of negative impulse generator 14 may be one-thousand cycles per second, while the length of time that switch tubes 12 and 13 are cut off by the negative impulse may be fifty to one hundred microseconds.

Figure 2:
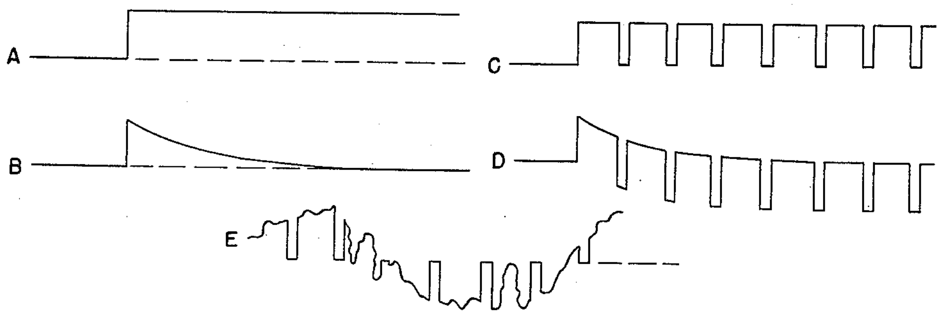
Fig. 2 is a group of representative wave forms occurring in conjunction with the system of Fig. 1 to better illustrate the principles of operation of the present invention.

The operation of this invention may be better understood by considering now the voltages generated in an R.-C. coupled amplifier not fitted with this adaptor when a direct current voltage, such as that shown in Fig. 2A, is applied as the input signal. The voltage at the output of the input coupling circuit corresponding to such an input signal would be initially proportional to the applied direct current voltage, as shown in Fig. 2B. This obtains because the voltage across the condenser in the input circuit to the amplifier cannot change instantaneously. Thus the voltage jump at the grid of the first stage of the amplifier would be equal, in amplitude, to the leading edge of the applied direct current voltage. The voltage level would then change exponentially from this initial value at a rate depending upon the time constant of the R.-C. coupling networks in the amplifier, as the coupling capacitor within the amplifier charged up to its steady state value of voltage for the applied direct current signal. Because of this exponential variation in voltage, it would be impossible at any time after the instant the direct current signal is first applied to the amplifier to ascertain the true magnitude of the applied signal from the magnitude of the output voltage from the coupling condenser. Similar amplitude distortion occurs when a low frequency A. C. signal or a varying D. C. signal is applied to the input due to appreciable charging or discharging of the coupling condenser compared to amplitude variation of the input signal.

However, if some means could be provided to generate a reference line, every point on which would be maintained at the proper voltage difference and polarity from the input signal at any instant in time irrespective of the distortion of the signal in the output of the coupling circuit due to charging or discharging of the capacitance, the magnitude of the applied signal could be readily ascertained from the output voltage of the A. C. amplifier by measuring the voltage difference between the reference line and the output voltage waveforms of the amplifier at any instant in time. Such a reference line is provided by the instant invention, as will be explained by reference to Figs. 1 and 3.

The voltage output from switch tubes 12 and 13, when the voltage of Fig. 2A is applied to the terminal 10, will be that represented in Fig. 2C. If this voltage were applied to the R.-C. coupled amplifier, the output voltage from that amplifier, assuming an even number of stages in the amplifier, would be as represented in Fig. 2D, due to the exponential decay of the applied voltage at the output of the coupling condenser corresponding to the exponential charging of the condenser. As will be seen, a reference line, such as described above, is sketched out by the extremities of the notches or periodically recurring impulses which are produced in the output voltage waveform whenever conduction ceases in switch tubes 12 and 13. By this means, an ordinary R.-C. coupled amplifier may be made useful for amplifying voltages having frequencies as low as zero frequency.

Referring again to Fig. 1, in this embodiment of the invention the voltage output of switch tube 12 is applied to an amplifier tube 15, the output of which is coupled through capacitor 16 to output terminals 11. The bias on amplifier tube 15, thus the operating point of tube 15, is determined by the bias control 17 coupled to the output of switch tube 13. This system is adapted to operate with a pair of out-of-phase or push-pull signals coupled to the input of tubes 12 and 13. The bias control 17 is operative to couple the input signal variations to switch tube 13 to the amplifier tube 15 in an out-of-phase relationship to the signal coupled from switch tube 12 during the absence of the negative impulses produced by generator 14. The bias control 17 is coupled to the amplifier tube 15 in such a manner as to cause the signal produced by the bias control and the signal coupled from the switch tube 12 to be additive when the signals in the output of the two switch tubes are in push-pull relationship, while maintaining the signal subtractive in the amplifier tube 15 when the signals applied at the two inputs to said amplifier tube are in push-push relationship. Thus bias control 17 is operative to reduce the magnitude of the voltage change at terminals 11 when the negative impulses or notches in the waveform of Fig. 2C are produced as described above. This is desirable because, if the magnitude of this voltage change resulting from the leading edge of the impulses is allowed to become great, certain stages of the alternating current amplifier coupled to the output terminal 11 may be driven to saturation or to cutoff and the above described reference line then becomes distorted and loses its reliability.

If a pair of out-of-phase or push-pull input signals is not available the terminal 10 forming the input to switch tube 13 may be grounded by switch 26 coupled between the input channel to switch tube 13 and ground, thus establishing a fixed operating or grid-bias point for bias control 17 and amplifier 15 during absence of the negative impulses. Since no out-of-phase signal would be coupled through switch tube 13 to the cathode of amplifier 15, the amplitude of the output signal from amplifier 15 would be somewhat lower than that in the above mentioned case in which the push-pull signal was applied.

Figure 3:
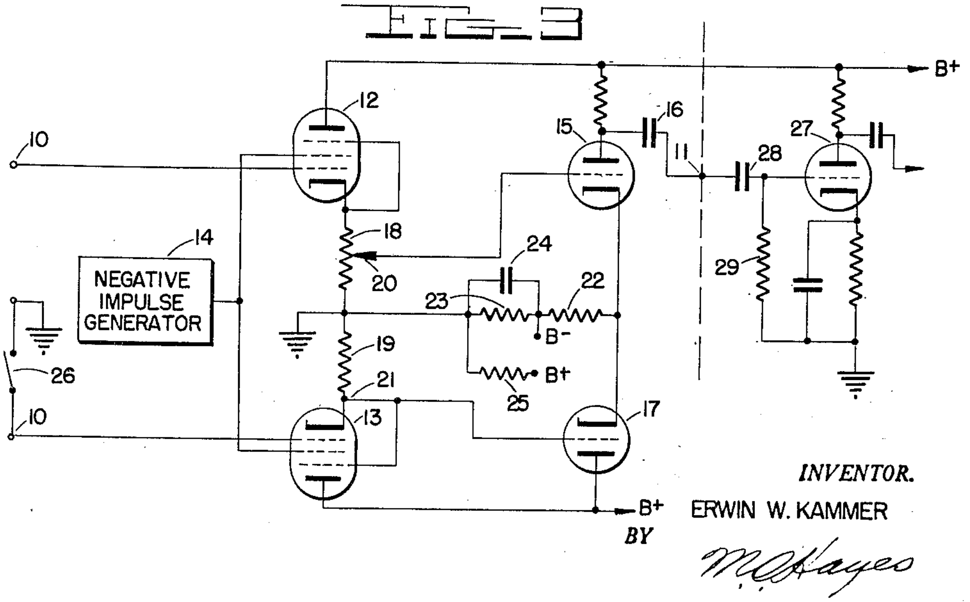
Fig. 3 is a schematic circuit diagram of the adaptor embodying the present invention.

Referring now to Fig. 3, showing the schematic circuit of the invention, the input signal is applied to the terminals 10 coupled directly to the control grid of switch tubes 12 and 13, which are pentodes of conventional design. The screen grids of the pentodes 12 and 13 are coupled to the output of the negative impulse generator 14. The cathodes of pentodes 12 and 13 are coupled through cathode resistors 18 and 19, respectively, to ground. Assuming the direct current voltage shown in Fig. 2A is applied to the input terminals 10, a direct current voltage will be supplied from a movable tap 20 on the cathode resistor 18 proportional to the current flow through tube 12 caused by the voltage on the control grid thereof. Likewise, a direct current voltage will be coupled from the ungrounded end of the cathode resistor 19 coupled to tube 13 proportional to the voltage on the control grid of that tube. It will be seen that negative pulses of high amplitude coupled from the negative impulse generator 14 to the screen grids of tubes 12 and 13 will be operative to cut off conduction through the tubes 12 and 13 and thus cause the voltage across cathode resistors 18 and 19 to drop to zero, placing the taps 20 and 21 at ground potential level and interrupting the direct current input waveform with a series of recurring negative notches as shown in Fig. 2C. The taps 20 and 21 on resistors 18 and 19 are coupled directly to the control grids of amplifier 15 and bias control tube 17, respectively. The cathodes of amplifier 15 and bias control 17 are coupled through a common cathode resistor 22 and resistor-capacitor network 23, 24 to ground.

The signal applied to the bias control 17 by controlling current flow therethrough establishes a proportional voltage at the intercoupled end of resistor 22 and the cathodes of tubes 15 and 17, thus effectively coupling the signal on the grid of bias control 17 to the cathode of amplifier tube 15. Thus, if the signals applied to the grid of tubes 15 and 17 are out-of-phase, these signals will be additive in tube 15 and generate a high amplitude voltage variation on the plate of amplifier 15. The negative impulses generated by negative impulse generator 14, however, carry the voltage on the grids of tubes 15 and 17 to ground for the duration of each impulse, thus carrying the voltage level at the plate of amplifier 15 to a level determined by the bias voltage developed across cathode resistor 22 due to current flow through the cathode circuits of tubes 15 and 17 when their grids are at zero potential. The waveforms thus produced at the plate of tube 15 would be the inverse of that shown in Fig. 2C. This pulsed waveform is coupled through condenser 16 and output terminal 11 to the input coupling network of the first stage of the alternating current amplifier, such as the amplifier stage indicated at 27 in Fig. 3. The discharge time constant of condenser 16 and the coupling network of amplifier stage 27 formed by condenser 28 and resistor 29, being small, would thus produce an exponential decay of the voltage waveform envelope, while responding accurately to the voltage variations occurring at the leading edges of the pulses. Resistor 23 and condenser 24 in the cathode circuit of tubes 15 and 17 are provided to reduce the cathode bias voltage from amplifier 15 during a very high amplitude positive signal on the grid of tube 15 by reducing the effective absolute magnitude of B— at the junction of resistors 22 and 23 in direct proportion to the input signal amplitude. This is accomplished by coupling resistor 23 and a resistor 25 in series across the ungrounded power supply, and grounding the junction of the two resistors. The junction between resistors 23 and 22 thus effectively becomes B—, the absolute magnitude of which is considerably reduced during the presence of a high amplitude positive signal on the grid of amplifier 15 due to the flow of current through resistor 23 to ground in a direction opposing the current flow caused by the power supply. This arrangement thus effectively reduces the net signal amplitude on the grid of amplifier 15 to prevent overdriving the stage.

The exponentially decaying voltage waveform at the output terminals 11, the inverse of that shown in Figs. 2B and 2D, is thus provided with a series of periodically recurring notches, as shown in Fig. 2D, the extremities of which may trace out a dotted line when displayed on a cathode ray oscillograph to form an accurate reference line from which the amplitude of the input signal at any given instant of time may be determined by measuring the signal level from the dotted reference line.

If an irregular or sinusoidal voltage waveform is applied as the input signal to terminals 10, and the potentiometer 20 in the cathode circuit of switch tube 12 is positioned to bias the amplifier tube 15 at an operating point during the occurrence of the negative impulses which is between the voltage limits of the input signal waveform on the grid of tube 15, the notches thus produced in the output voltage waveform of amplifier 15 would depend in both a positive and negative direction from the envelope of the waveform as shown in Fig. 2E. Obviously, due to the charging characteristics of the coupling condenser 16, there will be a slight positive or negative drift from the hypothetic zero or average reference line traced by the extremities of the notches, drifting positively on the positive half-cycles of the signal waveform and drifting negatively on the negative half-cycles of the voltage waveform. These variations, however, are quite slight when compared with the variations in the signal envelope. Thus, photographic recordings from an oscillograph presentation of the output of the amplifier coupled to this adaptor or the visual indication on the screen of a conventional cathode ray oscilloscope will permit the instantaneous amplitude of the signal voltage envelope to be determined by measuring the instantaneous amplitude from the group of notch extremity traces occurring closely adjacent in time to the occurrence of the signal voltage being measured.

It will be apparent, therefore, that a device has been provided by which input signals of very low frequency alternating current variations or slowly varying direct currents or a constant amplitude direct current signal may be broken up by a series of time-related periodically recurring negative pulses or notches bearing a predetermined amplitude relationship with the amplitude of the input signal at the instance of occurrence of the notches whereby this combined signal, when passed through the short time constant resistance-capacitance coupling input of a standard alternating current amplifier, will trace, due to the high frequency character of this combined waveform, a reference line from which the instantaneous amplitude of the signal voltage waveform at any instant in time can be accurately determined irrespective of condenser distortion.

By the above means, a conventional alternating current amplifier, having good medium and high frequency response characteristics, can be adapted, by the conversion of a very low frequency or direct current input signal into a high frequency pulsed waveform, to display good frequency response characteristics all the way down to zero frequency, without the usual consequent sacrifice of its high frequency response characteristics.

Various modifications may be made in the invention as required by the particular applications to which it may be put. For example, were it required because of the low voltage level of the input signal to introduce amplification of the signal in the switching stage, the tube forming this stage may be operated with its cathode and grids at a predetermined negative bias level and the plate coupled through a load resistor to ground, the output signal being coupled from the ungrounded end of the plate load resistor.

While one particular embodiment of the invention has been particularly shown and described it is distinctly understood that the invention is not limited thereto but that modifications may be made within the spirit of the invention and such variations as are covered by the scope of the appended claims.

This invention may be manufactured and used by or for the Government of the United States of America for governmental purposes without the payment of any royalties thereon or therefor.

What is claimed is:

1. Means for extending the useful lower frequency limit of a capacitively coupled electronic circuit to zero frequency, comprising generator means operative to produce periodically recurring negative impulses, a normally conducting switch tube having means associated therewith for coupling an input signal thereto, means coupling the recurring negative impulses to said switch tube to render said tube nonconducting for the duration of each of said impulses, a cathode load resistor for said switch tube, said load resistor having an output terminal operative to return to ground potential during the occurrence of said negative impulses, vacuum tube amplifier means having at least anode, cathode and control grid electrodes and having its control grid coupled to the cathode of said switch tube, normally conducting bias control means coupled to the amplifier cathode, means coupling the negative impulses to said bias control means.

2. Means for extending the useful lower frequency limit of a capacitively coupled electronic circuit down to zero frequency, comprising normally conducting first electron switch tube means having an input signal channel coupled thereto, second electron switch tube means having an input signal channel coupled thereto, said two input signal channels being operative to supply signals of inverse phase, means for generating negative voltage impulses, means coupling the negative voltage impulses to the two switch tubes to render said tubes periodically non-conducting, a cathode load resistor for each of said switch tubes, each of said load resistors having an output terminal operative to return to ground potential during the occurrence of said negative impulses, means for selectively controlling the relative amplitudes of the output voltages of the two switch tubes, amplifier means including a vacuum tube having at least cathode, anode and control grid electrodes, means for coupling the output of the first switch tube to the control grid of the amplifier means, means coupling the output of the second switch tube to the cathode of the amplifier means.

3. In combination, generator means operative to produce a series of periodically recurring negative impulses, a pair of normally conducting switch tubes, an input signal channel coupled to each of said switch tubes, means coupling said negative impulses to said switch tubes to render said switch tubes periodically non-conducting for the duration of each of said impulses, a cathode load resistance for each of said switch tubes, each of said load resistances having an output terminal operative to return to ground potential during the occurrence of said negative impulses, direct current amplifier means including a vacuum tube having at least anode, cathode and control grid electrodes, said control grid being connected to the output terminal of one of said switch tubes, means coupling the output terminal of the other of said switch tubes to the cathode of said direct current amplifier, resistance-capacitance coupled amplifier means, and means coupling the output of the direct current amplifier to the resistance-capacitance input circuit of the amplifier.

ERWIN W. KAMMER.

REFERENCES CITED

The following references are of record in the file of this patent:

UNITED STATES PATENTS

| Number | Name | Date |
|---|---|---|
| 2,153,752 | Gurtler | Apr. 11, 1939 |
| 2,179,265 | Luck | Nov. 7, 1939 |
| 2,300,999 | Williams | Nov. 3, 1942 |
| 2,324,314 | Michel | July 13, 1943 |

OTHER REFERENCES

Dumont Oscillographer, vol. 3, Nos. 6 and 7, pages 1–5, Aug.–Sept. 1939. (Copy in 250–27C Literature.)